United States Patent [19]

Fry

[11] 3,862,064

[45] Jan. 21, 1975

[54] MOULDING COMPOSITIONS CONTAINING UNSATURATED AND SATURATED POLYESTERS, CELLULOSE ESTER AND MONOMERIC MATERIAL

[75] Inventor: David Philip Fry, Llanishen, Wales, Great Britain

[73] Assignee: BP Chemicals International Limited, London, England

[22] Filed: Sept. 28, 1973

[21] Appl. No.: 401,599

[30] Foreign Application Priority Data
Oct. 6, 1972 Great Britain.................... 46287/72
Nov. 30, 1972 Great Britain.................... 55273/72

[52] U.S. Cl. ................................. 260/16, 260/861
[51] Int. Cl. ............................................. C08g 39/10
[58] Field of Search ....................................... 260/16

[56] References Cited
UNITED STATES PATENTS

| | | | |
|---|---|---|---|
| 2,856,378 | 10/1958 | Lundberg....................... | 260/861 X |
| 3,285,995 | 11/1966 | Nametz et al.................. | 260/869 X |
| 3,489,707 | 1/1970 | Fry................................. | 260/862 |
| 3,642,672 | 2/1972 | Kroekel.............................. | 260/16 |
| 3,642,683 | 2/1972 | Fry................................. | 260/862 |
| 3,736,278 | 5/1973 | Wada et al....................... | 260/861 |
| 3,772,241 | 3/1973 | Kroekel............................. | 260/40 R |

FOREIGN PATENTS OR APPLICATIONS

| | | | |
|---|---|---|---|
| 936,351 | 9/1963 | Great Britain..................... | 260/862 |
| 937,703 | 9/1963 | Great Britain..................... | 260/862 |

Primary Examiner—Melvin Goldstein
Assistant Examiner—Edward Woodberry

[57] ABSTRACT

Thermosetting unsaturated polyester resin based sheet moulding compounds containing a saturated liquid polyester and a thermoplastic cellulose ester as the additives to control the shrinkage on moulding.

10 Claims, No Drawings

MOULDING COMPOSITIONS CONTAINING UNSATURATED AND SATURATED POLYESTERS, CELLULOSE ESTER AND MONOMERIC MATERIAL

The present invention relates to unsaturated polyester resin compositions and particularly to thermosetting moulding compounds in the form of sheet moulding compounds prepared therefrom.

By sheet moulding compound (SMC) is meant throughout this specification a continuous web of fibrous reinforcement impregnated with a composition containing as essential components a chemically thickened unsaturated polyester and a monomeric material which is copolymerisable therewith, said polymerisable components being compounded with conventional catalysts, fillers, etc., the whole forming a stable, moulding compound in the form of a sheet which can be fabricated into hard, infusible, shaped articles by the action of heat and pressure in a heated mould.

Unsaturated polyester moulding compounds have the disadvantage that when moulded into infusible articles, they tend to crack and shrink to give articles having poor quality moulded surfaces, particularly when used in the production of articles having relatively thick sections. In our published British patent specification No. 1,098,132 it is proposed that unsaturated polyester moulding compositions for moulding at elevated temperatures and pressures should contain a saturated liquid polyester to prevent shrinkage and cracking on moulding, and sufficient thermoplastic polymer, which polymer is capable of being plasticised by said saturated liquid polyester, to prevent the deleterious exudation of the saturated liquid polyester on moulding. This system is particularly useful in dough moulding compounds because the shrinkage and exudation can be entirely eliminated, but when it is used in sheet moulding compounds, which generally have a higher liquid content than dough moulding compounds, and contain thickening (maturation) agents such as group II metal oxides and hydroxides, it does not always give sufficient control of the shrinkage, owing to a tendency for exudation of the resin system to occur before moulding when many thermoplastic polymers are employed.

It is an object of the present invention to provide sheet moulding compounds which can be moulded at elevated temperatures and pressures to give improved moulded articles. It is a further object to provide sheet moulding compounds which can be moulded to give moulded articles which are relatively free from cracks and shrinkage and which accurately reproduce the surface of the mould.

Accordingly, the present invention is an unsaturated polyester resin composition for sheet moulding compounds comprising (1) an unsaturated polyester, (2) a copolymerisable monomer, (3) a saturated liquid polyester and (4) a cellulose ester.

Unsaturated polyester for use in sheet moulding compositions are well known. See for example, British patent specification No. 1,098,132. The preferred unsaturated polyesters for use in the compositions of the present invention are those which have a relatively high hot rigidity in the thermoset state, so that any reduction of rigidity due to the presence of the saturated polyester is offset. Examples of such unsaturated polyesters are those in which more than 50 molar percent of their acidic residues are derived from maleic or fumaric acids. Examples are polypropylene glycol maleate or fumarate, or such unsaturated polyesters with a minor proportion of the maleic or fumaric residues replaced by isophthalic or carbic acid residues. Also suitable are unsaturated polyesters containing more than 50 molar percent of maleic and fumaric acid residues and alcohol residues derived from Bisphenol A adducts with ethylene oxide or propylene oxide. Further suitable unsaturated polyesters are those in which a minor proportion of the maleic or fumaric acid residues are replaced by chloro-acid residues such as tetra-chlorophthalic or chlorendic acid residues.

The copolymerisable monomer is suitably a liquid monomer having $\alpha,\beta$-ethylenic unsaturation for example styrene and vinyl toluene and other unsaturated materials such as diallyl phthalate. The unsaturated polyester is usually dissolved in the copolymerisable monomer. The amount of copolymerisable monomer used is suitably in the range from 20 to 60% by weight and preferably from 40 to 50% by weight based on the total weight of the unsaturated polyester resin and copolymerisable monomer.

The saturated liquid polyesters suitable for use in the compositions of the present invention are those substances which are known per se mainly as plasticisers for various thermoplastic resins. The saturated polyesters are liquid, by which is meant that they have a melting point below 30°C. They are prepared by esterifying a polyhydric alcohol with a polybasic acid. Particularly preferred are the saturated polyesters prepared by the inter-esterification of propylene glycol with adipic acid to give a polypropylene adipate such as Hexaplas PPA (Hexaplas is a registered trade mark) and the inter-esterification of propylene glycol with sebacis acid to give a polypropylene sebacate such as Reoplex 100 (Reoplex is a registered trade mark) and Paraplex G25 (Paraplex is a registered trade mark). The unsaturated polyester resin composition suitably contains 2.0 to 25.0 parts by weight and preferably 10 to 20 parts by weight of saturated liquid polyester for every 100 p.b.w. of the combined weight of unsaturated polyester and copolymerisable monomer present.

The term cellulose ester is used in this specification to include mixed esters of cellulose. Suitable esters include the lower fatty acid esters, i.e. acetates, propionates, and butyrates and other known esters of up to $C_6$ fatty acids. The cellulose esters can be esters in which all the esters groups in each cellulose ester are derived from the same or alternatively derived from different acids. The cellulose esters used can be one cellulose ester or mixtures of different cellulose esters.

The quantity of cellulose ester should be sufficient to prevent the exudation of liquid material from sheet moulding compounds prepared from the unsaturated polyester resin compositions of the present invention, both before and during the moulding process.

Typically the weight of cellulose ester used is of the same order as the weight of saturated liquid polyester e.g. from 2.0 to 25.0 parts by weight and preferably from 10 to 20 parts by weight, for every 100 parts by weight of the combined weight of the unsaturated polyester and copolymerisable monomer. The cellulose ester is suitably added to the composition as a solution in resin monomer solution or in monomer.

A particular advantage of the present invention is that the resin monomer and shrinkage control agents can be prepared as a "one-pack" solution with careful selection of the type and quantity of cellulose ester and monomer employed.

The unsaturated polyester composition may contain any of the polymerisation ingredients conventionally present in polyester moulding materials. Examples of such ingredients are polymerisation inhibitors to prevent the premature polymerisation on storage such as butylated hydroxy toluene, hydroquinone, t-butylcatechol; and polymerisation initiators e.g. benzoyl peroxide, ditertiary butyl peroxide, tertiary butyl perbenzoate and methyl ethyl ketone peroxide.

The present invention is further an unsaturated polyester resin based sheet moulding compound comprising (1) an unsaturated polyester resin composition as hereinbefore described, (2) a fibrous reinforcement (3) a mineral filler and (4) a stiffening agent as hereinafter defined.

Suitably the unsaturated polyester resin composition constitutes from 20 to 40% by weight and preferably from 25 to 35% by weight of the weight of the total sheet moulding compound.

The fibrous reinforcement is suitably present in the form of a continuous sheet or as random fibres. Such fibrous reinforcing materials are well known in the art. The preferred fibrous reinforcing material is glass fibre, either in sheet form based on chopped strands or continuous filaments or loose chopped strands. Suitably the sheet moulding compounds of the present invention contain from 15 to 40% by weight and preferably from 20 to 35% by weight of fibrous reinforcement based on the total weight of the sheet moulding compound.

Mineral fillers suitable for use in the sheet moulding compounds of the present invention are those well known in the art for use in unsaturated polyester moulding compositions. The filler can consist entirely of a bulking filler, for example calcium carbonate, alumina, calcium sulphate, blanc fixe and clay, or may include additionally pigments, for example titanium dioxide, and fire retarding agents for example chlorinated paraffins, pentabromotoluene, and antimony oxide. The total weight of such fillers used in the sheet moulding compounds of the present invention is suitably in the range 20 to 60% by weight and preferably in the range 30 to 40% by weight, based on the total weight of the sheet moulding compound.

By stiffening agent is meant throughout this specification a compound which causes an increase in viscosity of the unsaturated polyester resin used in the sheet moulding compound over a period of time without initiating the vinyl copolymerisation between the unsaturated polyester and the copolymerisable monomer. This viscosity increase enables the mixture of polyester resin composition, fillers and stiffening agent to be applied to the fibrous reinforcement in a relatively fluid form, allowing thorough wetting of the fibres by the resin to occur before the viscosity of the resin increases to give a sheet moulding compound which is stiff enough to be easily handled and stored.

An example of such stiffening agents is the group of materials known as maturation agents for sheet moulding compounds. Suitable maturation agents include the oxides and/or hydroxides of elements in Group IIA of the periodic table, especially calcium and magnesium. The rate at which such compounds thicken an unsaturated polyester resin composition and the final viscosity increase achieved varies considerably with the particular compound chosen, the quantity added, the nature of the unsaturated polyester used, the particle size of the filler and the water content of the composition. Ideally, the maturation agents should cause a minimum viscosity increase in the first few hours after application of the resin system to the fibrous reinforcement, followed by a rapid increase in viscosity over a short period of time to the desired maximum. This is suitably achieved by the use of a mixture of such agents. For example a mixture of calcium oxide which itself gives a slow rate of viscosity increase, and calcium hydroxide, which itself gives a fast rate of viscosity increase can be used. As these maturation agents are generally not soluble in the polyester resin composition, they are suitably predispersed in a small quantity of the copolymerisable monomer before incorporation in the sheet moulding compound. The amount of maturation agent used is suitably in the range 0.1 to 3.5% by weight expressed as the weight of the metal component of the maturation agent based on the weight of the unsaturated polyester together with the copolymerisable monomer.

Stiffening can also be achieved by other processes and additives.

The sheet moulding compounds of the present invention may be prepared by passing a glass fibre mat through a polyester resin mix i.e. a mixture of the remaining ingredients of the sheet moulding compound as herein described, interleaving the wetted mat between polyethylene films and passing it through compression rolls to effect impregnation of the glass by the resin mix. Further kneading and compression may be carried out by ribbed rollers if required.

Alternatively sheet moulding compound may be prepared by coating layers of polyester resin mix onto polyethylene films, applying glass fibres produced by chopping glass roving before bringing the films together to form a composite and passing this composite through compression rollers to effect impregnation of the glass by the resin mix.

The unsaturated polyester resin compositions of the present invention and the sheet moulding compounds prepared therefrom are illustrated in the following example.

EXAMPLE

An unsaturated polyester resin composition A was prepared from the following components:

| | |
|---|---|
| Unsaturated polyester resin (60wt% soln. in styrene | 62.6 p.b.w. |
| Cellulose acetate butyrate (1/10 second moulding grade ex Eastman Chemicals) | 9.3 p.b.w. |
| Hexaplas PPA (polypropylene adipate ex ICI Limited) | 9.3 p.b.w. |
| Styrene monomer | 18.6 p.b.w. |
| Butylated Hydroxy toluene | 0.2 p.b.w. |
| An unsaturated polyester resin composition B suitable for impregnation of glass-fibre to form SMC was prepared according to the following formulation:- | |
| Unsaturated polyester resin composition A | 43.1 p.b.w. |
| t-butyl perbenzoate | 0.8 p.b.w. |
| Zinc stearate | 1.7 p.b.w. |
| Stearin | 0.8 p.b.w. |
| Inorganic filler (Snowcal 7ML ex Cemment Marketing Company Limited) | 51.3 p.b.w. |
| Calcium hydroxide | 0.8 p.b.w. |
| Styrene monomer | 1.5 p.b.w. |

Composition B was used to impregnate chopped strand glass fibre mat to produce an SMC of glass content 25% by weight. The SMC was allowed to stiffen at 20°C for 3 days before stripping the polyethylene film and moulding. When moulded under heat and pressure in a matched metal mould the SMC gave a moulding having a low profile surface and good mechanical strength.

The above formulation was reproduced using (i) polystyrene, and (ii) polyvinyl chloride as the thermoplastic polymer in place of the cellulose acetate butyrate for comparative purposes. Mouldings produced from these compounds had inferior surface finishes.

The above formulation can be reproduced using cellulose propionate (Half second propionate ex Eastman Chemicals) in place of the cellulose acetate butyrate. Such a composition when moulded under heat and pressure as described above will give a moulding having a similar low profile surface and good mechanical strength.

I claim:

1. An unsaturated polyester resin composition for sheet moulding compounds comprising (1) an unsaturated polyester, (2) a copolymerisable monomer, (3) a saturated liquid polyester obtained by esterifying a polyhydric alcohol with a polybasic acid, and (4) a cellulose ester of a fatty acid of up to 6 carbon atoms.

2. A composition as claimed in claim 1 wherein the saturated liquid polyester is polypropylene adipate or polypropylene sebacate.

3. A composition as claimed in claim 1 wherein the cellulose ester is an ester of acetic, propionic or butyric acid.

4. A composition as claimed in claim 1 wherein the cellulose ester has all the ester groups derived from the same acid.

5. A composition as claimed in claim 1 wherein the cellulose ester has ester groups derived from more than one acid.

6. A composition according to claim 1 wherein the cellulose ester is a cellulose acetate butyrate.

7. A composition as claimed in claim 1 which contains 10 to 20 parts by weight of saturated liquid polyester for every 100 parts of the combined weight of unsaturated polyester and copolymerisable monomer.

8. A composition as claimed in claim 1 which contains from 10 to 20 parts by weight of the cellulose ester to every 100 parts of the combined weight of unsaturated polyester and copolymerisable monomer.

9. A sheet moulding compound comprising (1) an unsaturated polyester resin composition as claimed in claim 1, (2) a fibrous reinforcement, (3) a mineral filler and (4) a stiffening agent.

10. A sheet moulding compound as claimed in claim 9 in which the unsaturated polyester resin composition constitutes from 20 to 40% by weight of the sheet moulding compound.

* * * * *